(12) United States Patent
Besteiro et al.

(10) Patent No.: US 11,927,276 B2
(45) Date of Patent: Mar. 12, 2024

(54) PRESSURE COMPENSATION VALVE

(71) Applicant: FAS MEDIC S.A., Palézieux (CH)

(72) Inventors: Julien Besteiro, Gland (CH); Eric Favre, Champvent (CH); Vincent Tanari, Satigny (CH); André Caligara, Hermance (CH)

(73) Assignee: FAS MEDIC S.A., Palézieux (CH)

( * ) Notice: Subject to any disclaimer, the term of this patent is extended or adjusted under 35 U.S.C. 154(b) by 0 days.

(21) Appl. No.: 17/751,736

(22) Filed: May 24, 2022

(65) Prior Publication Data

US 2022/0403948 A1    Dec. 22, 2022

(51) Int. Cl.
*F16K 31/06* (2006.01)

(52) U.S. Cl.
CPC ...... *F16K 31/0693* (2013.01); *F16K 31/0648* (2013.01); *F16K 31/0668* (2013.01)

(58) Field of Classification Search
CPC ............. F16K 31/0693; F16K 31/0648; F16K 31/0668; F16K 31/0655; F16K 31/0675; F16K 1/00; F16K 1/36; F16K 39/02; F16K 39/022; H01F 7/1638
USPC ....................................... 251/129.07, 129.16
See application file for complete search history.

(56) References Cited

U.S. PATENT DOCUMENTS

| | | | | |
|---|---|---|---|---|
| 4,953,825 A | * | 9/1990 | Osumi ............... | F16K 31/0693 251/129.17 |
| 6,505,812 B1 | * | 1/2003 | Anastas ................. | F16K 41/10 251/282 |
| 9,464,729 B2 | * | 10/2016 | Robertson, III ..... | G05D 7/0635 |

(Continued)

FOREIGN PATENT DOCUMENTS

| | | |
|---|---|---|
| CN | 112413136 A | 2/2021 |
| EP | 3263962 A1 | 1/2018 |
| EP | 3263962 B1 * | 11/2019 ......... F16K 31/0655 |

OTHER PUBLICATIONS

European Search Report for European Patent Application No. 21180392.9 dated Dec. 13, 2021.

*Primary Examiner* — Matthew W Jellett

(74) *Attorney, Agent, or Firm* — Young Basile Hanlon & MacFarlane, P.C.

(57) ABSTRACT

A valve assembly is disclosed, which includes a valve body defining a valve chamber and a moveable member. The moveable member has a valve element at its first end and an armature at its second end. The moveable member is moveable in an axial direction to selectively open and close the valve. The entire moveable member is spaced from the walls of the valve body when the valve is open or partially open. A flexible membrane forms a seal against the moveable member and the valve body to divide the valve chamber into a flow chamber in which the valve seat and valve element are located and a pressure compensation chamber within which the armature is entirely enclosed. A first fluid port is fluidly connected to the pressure compensation chamber via one or more bores in a pressure compensation flow path with at least one opening extending into the pressure compensation chamber at an axial position between the armature and the flexible membrane. The pressure compensation flow path includes a first axial portion with a first cross-sectional area and a second axial portion with a second, smaller cross-sectional area.

11 Claims, 4 Drawing Sheets

(56) References Cited

U.S. PATENT DOCUMENTS

2012/0323379 A1* 12/2012 Robertson, III .... F16K 31/0693
 700/282
2016/0131276 A1 5/2016 Okawara \* cited by examiner

PRESSURE COMPENSATION VALVE

CROSS-REFERENCE TO RELATED APPLICATIONS

This application is a United States national stage application of, and claims priority to, European Patent Application No.: 21180392.9, filed Jun. 18, 2021.

TECHNICAL FIELD

The present invention relates to a valve assembly and, in particular, to a valve assembly having a pressure compensation chamber.

BACKGROUND OF THE INVENTION

Various forms of fluid flow control valves, which can be suitable for controlling the flow of liquids or gases, are known in the art. Such valves include on/off switching valves, pressure control valves and proportional flow control valves, and are generally actuated by an input actuator, which can be provided in the form of a solenoid. A solenoid may be used to generate a magnetic field which can exert a magnetic force on a moveable member to provide opening, closing and/or switching of the valve by selectively bringing a valve element into and out of contact with a valve seat. Such valves typically include a biasing member that generates a biasing force to oppose the magnetic force. Therefore, in the absence of a magnetic field from the solenoid, the biasing force maintains the valve in a normally open or normally closed position. The biasing force should be sufficient to counteract the pressure of fluid acting against the valve element in order to keep the moveable member in a desired position, such as a closed position. For valves in which there is a high pressure difference across the valve element, the biasing member is typically configured to provide a high biasing force to prevent inadvertent lifting or closing of the valve element. In order to switch the valve to a different position, such as an open position, a relatively high actuating force may be required to overcome the biasing force of the biasing member. This can result in an undesirable increase in the size of the valve assembly and/or the power requirements. A known way of reducing the sizes and/or strengths of the biasing member or actuator is to use pressure compensation.

The inventors have identified a need to modify known valve structures in order to permit the miniaturisation of valves and to allow for the smaller displacements and actuating forces which may be experienced when seeking to create a smaller sized valve having improved precision.

SUMMARY OF THE INVENTION

According to a first aspect of the invention, there is provided a valve assembly for a valve, comprising:
- a valve body having walls defining a valve chamber;
- a first fluid port;
- a second fluid port;
- a valve seat located between the first and second fluid ports;
- a moveable member comprising a valve element at its first end and an armature at its second end, wherein the moveable member is moveable in an axial direction to bring the valve element into and out of engagement with the valve seat to selectively open and close the valve, and wherein the entire moveable member is spaced from the walls of the valve body when the valve is open or partially open;
- at least one biasing member configured to support and bias the moveable member in the axial direction; and
- a flexible membrane which forms a seal against the moveable member and the valve body to divide the valve chamber into a flow chamber in which the valve seat and valve element are located and a pressure compensation chamber within which the armature is entirely enclosed,
- wherein the moveable member comprises one or more bores defining a pressure compensation flow path by which the first fluid port is fluidly connected to the pressure compensation chamber, the pressure compensation flow path having at least one opening extending into the pressure compensation chamber at an axial position between the armature and the flexible membrane, and,
- wherein the pressure compensation flow path comprises: a first axial portion with a first length and a first cross-sectional area and a second axial portion adjacent to the first axial portion with a second length and a second cross-sectional area which is less than the first cross-sectional area.

In valves for precision applications, it can be particularly important to provide predictable, repeatable operation of the valve, which is resistant to undue influence by external factors such as supply pressure or flow rates, to ensure correct operation of equipment into which the valve is integrated. Such factors can be particularly important in micro-fluidic valves, since the smaller sizes of components and of the assembly mean that variations in component properties or valve operation can have a relatively large effect on the overall performance of the valve. One way of improving repeatability and resilience to external pressure variations is to provide a pressure-compensated valve.

The present disclosure seeks to improve the performance of known valves by optimising the pressure compensation flow path. By arranging the pressure compensation flow path to comprise at least one opening extending into the pressure compensation chamber at an axial position between the armature and the flexible membrane, and by forming the pressure compensation flow path from at least two axial portions having different cross-sectional areas, the flow characteristics of fluid in the pressure compensation flow path can be improved, resulting in an optimised valve which can be actuated with better precision. This differs from some existing arrangements in which the pressure compensation flow path terminates at an opening on the upper surface of the armature and away from the flexible membrane. In such valves, fluctuations in the fluid pressure changes at the first fluid port can take some time to be transmitted to the pressure compensation chamber side of the flexible membrane due to the distance between the opening and the flexible membrane or due to flow restrictions between the opening and the flexible membrane, such as a flow restriction between the walls of the pressure compensation chamber and the side edges of the armature. This delay can make accurate control of the valve more difficult, particularly when the valve is held in a partially open position by the solenoid. By providing the pressure compensation flow path with at least one opening extending into the pressure compensation chamber at an axial position between the armature and the flexible membrane, fluctuations in the fluid pressure changes at the first fluid port can be transmitted to the pressure compensation chamber side of the flexible membrane more quickly, since the fluid does not need to first flow over the top and around the sides of the armature. Further, by providing the pressure compensation flow path with a first axial portion with a first cross-sectional area and a second axial portion with a second cross-sectional area which is less than the first cross-sectional area, the inventors have found that the control accuracy of the valve can be further improved. Without wishing to be bound by theory, this is believed to be due to a funnelling effect as the fluid travels along the pressure compensation flow path and passes between the first and second axial portions. The first and second cross-sectional areas each define first and second hydraulic diameters. One or both of the first and second cross-sectional areas may be constant along substantially the entire length of the first and/or second axial portions. The first and second axial portions may have any suitable cross-sectional area, for example circular, oval, square, rectangular, or other regular polygon. Where the first and second axial portions have circular cross-sectional shapes, the first and second cross-sectional areas are defined by the first and second diameters of the first and second axial portions.

In some embodiments of the invention, the armature may be flat. As used herein, 'flat' describes the general shape of the armature as one which is elongate in a transverse direction. That is, an armature having a maximum transverse dimension which is greater than its maximum axial dimension. With this arrangement, the entire armature can be located beyond the axial end of the solenoid coil during use to provide a compact arrangement while still providing sufficient magnetic interaction between the armature and the solenoid coil. Further, by housing the armature entirely within the pressure compensation chamber, friction between the armature and other components of the valve can be reduced or eliminated entirely. This can be contrasted with some known armatures which comprise an axial rod that extends into the hollow core of the solenoid coil. The flat armature may have any suitable shape. For example, the flat armature may comprise an approximately disc-shaped component. The flat armature may have a circular cross-sectional shape. The flat armature may have a maximum transverse dimension which is at least twice the maximum axial dimension, or three times, or four times, or five times as great as the maximum axial dimension.

The moveable member may be a free-floating moveable member. In such arrangements, the entire moveable member is spaced from the valve body and from any actuator assembly with which the valve assembly is used. This can eliminate any friction between the moveable member and surrounding portions of the valve assembly to provide a more precise and longer lasting valve assembly. With a free-floating moveable member, the moveable member may be constrained only by the biasing member and the flexible member when the valve is in its open position. The moveable member may be free to oscillate about a lateral axis when the valve is in the open position, subject to the stiffness and/or compliance of the biasing member and the flexible member. When the valve is in its closed position, the moveable member may additionally be constrained by its contact with the valve seat.

The first length may be at least 20 percent of the second length. That is to say, the first axial portion may be at least one fifth as long as the second axial portion. Preferably, the first length is as large of a proportion of the second length as possible. In some embodiments, the first length may be at least 40 percent, or 60 percent, or 80 percent of the second length. This provides the advantage of maximising the length of the first axial portion of the pressure compensation flow path. Since the first axial portion has a larger cross-sectional area than the second axial portion, by increasing the length of the first axial portion relative to the second axial portion, the proportion of the pressure compensation flow path that is defined by a larger cross-sectional area is increased, which provides for improved flow characteristics.

The first axial portion is adjacent to the second axial portion. The first axial portion may be immediately adjacent to the second axial portion. The pressure compensation flow path may comprise a transition portion between the first axial portion and the second axial portion by which the cross-sectional area of the pressure compensation flow path gradually decreases from the first cross-sectional area to the second cross-sectional area. The transition portion may be sloped or curved. Alternatively, the pressure compensation flow path may comprise a step portion by which the cross-sectional area of the pressure compensation flow path decreases immediately from the first cross-sectional area to the second cross-sectional area.

The moveable member may comprise a shaft portion. The shaft portion may extend axially between the valve element and the armature. The valve element may comprise a first axial bore. The shaft portion may comprise a second axial bore. The first axial portion of the pressure compensation flow path may be defined by the first axial bore. The second axial portion of the pressure compensation flow path may be defined by the second axial bore.

The shaft portion and the valve element may be discrete components, preferably fixed together with an interference fit. A first end of the shaft portion may be press fit within the first axial bore of the valve element to fix the shaft portion to the valve element. This provides an arrangement in which the components of the moveable member can be secured together using an advantageous method of assembly.

The shaft portion may comprise at least one transverse bore in fluid communication with the second axial bore. The at least one transverse bore may form part of the pressure compensation flow path. The at least one transverse bore may define the at least one opening of the pressure compensation flow path. The transverse bore may extend substantially perpendicular to the axial direction of the moveable member. The shaft portion may comprise at least two, at least three, or preferably at least four transverse bores. This improves the pressure compensation characteristics of the valve assembly. In some arrangements, the shaft portion may comprise at least five or at least six transverse bores.

The shaft portion may comprise at least one transversely extending shoulder. At least one transverse bore may be defined in the at least one transversely extending shoulder. The shaft portion and the armature may be discrete components, preferably fixed together with an interference fit.

At least one opening may extend into the pressure compensation chamber at a position immediately adjacent to the flexible membrane. The at least one opening may be a plurality of openings. The flexible membrane may be planar.

BRIEF DESCRIPTION OF THE DRAWINGS

Further features and advantages of the present invention will become apparent from the following description of embodiments thereof, presented by way of example only, and by reference to the drawings, wherein.

DETAILED DESCRIPTION

A valve assembly is described herein in the context of a valve for controlling the flow of fluids, such as liquids or gasses. The valve assembly includes a valve body, defining a valve chamber, and a first fluid port and a second fluid port, through which fluid can flow between the valve and components into which the valve is integrated. The valve assembly further includes a moveable plunger which can be moved along an axis of the valve assembly. A valve element is provided in fixed relation to the plunger which can open or close a fluid path between the first and second fluid ports by engaging with a valve seat. The plunger is actuated by means of an armature comprised in the plunger in combination with a solenoid assembly. The solenoid assembly includes a coil of wire wrapped around a bobbin which can be energised in order to induce a magnetic field to thereby control the movement of the armature. A biasing member connected to the moveable member can provide a biasing force in the opposite direction to a magnetic force provided by the solenoid.

The valve assembly includes a pressure compensation mechanism. In this respect, the valve chamber is delimited from a pressure compensation chamber by a flexible membrane. The plunger includes a pressure compensation flow path which fluidly connects the first fluid port to the pressure compensation chamber in which the armature is located. The pressure compensation flow path has at least one opening extending into the pressure compensation chamber at an axial position between the armature and the flexible membrane. Furthermore, the pressure compensation fluid path includes a first axial portion with a first cross-sectional area and a second axial portion with a second cross-sectional area which is less than the first cross-sectional area.

Figure 1:
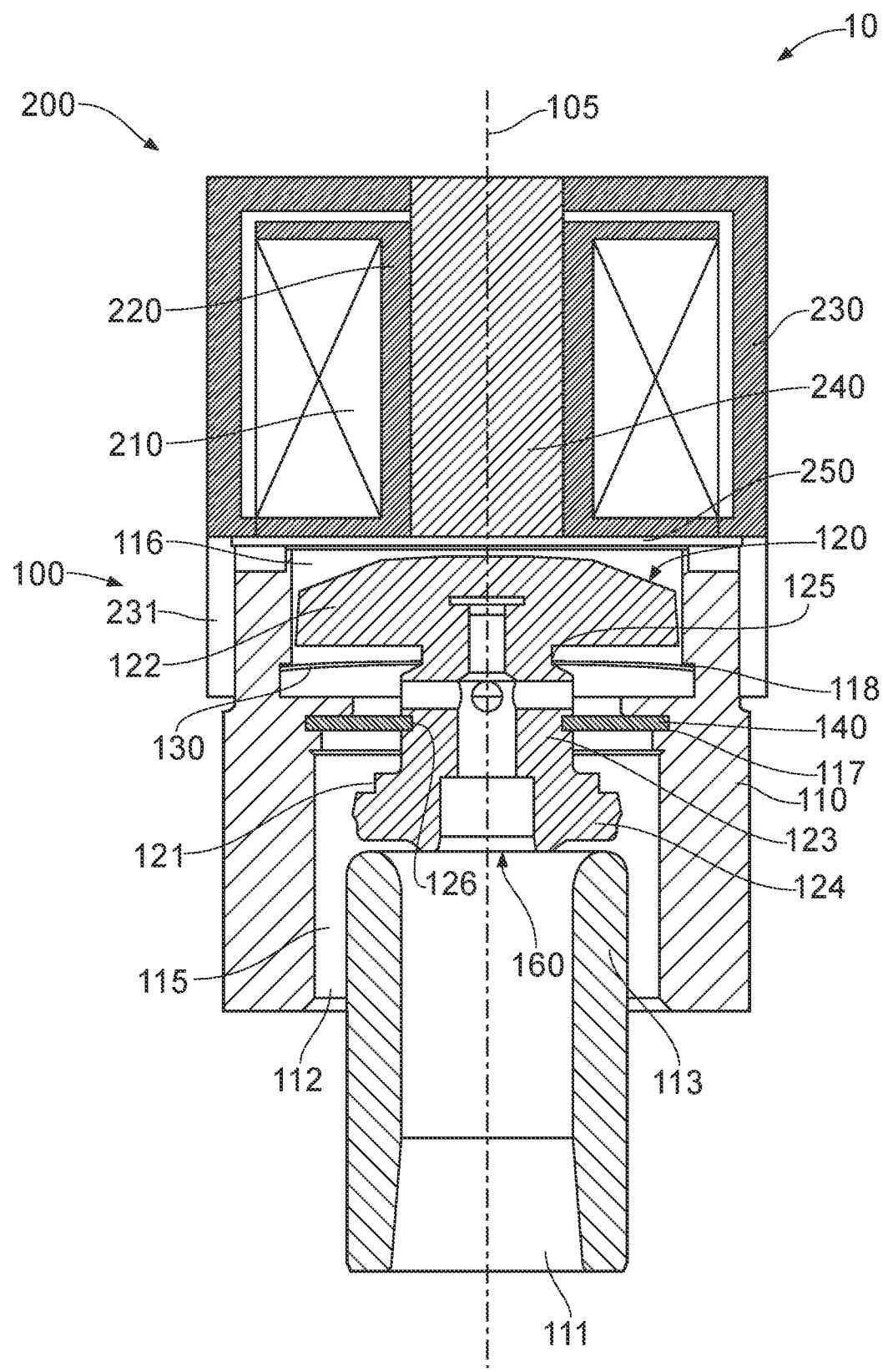
FIG. 1 is a cross-sectional view illustrating a valve comprising a valve assembly according to a first embodiment of the present invention, and an actuator assembly.

Referring to the drawings, FIG. 1 shows a cross-sectional view of a valve 10 comprising a valve assembly 100 according to the present invention and an actuator assembly 200. The valve assembly 100 comprises a valve body 110 defining a valve chamber 115. The valve body 110 comprises a first fluid port 111 and a second fluid port 112 with a valve seat 113 located therebetween. The valve assembly 100 further comprises a moveable member 120, typically referred to as a plunger. The moveable member 120 comprises a valve element 121 at its first end for selectively sealing against the valve seat 113. The valve element 121 may comprise a transversely extending shoulder 124 which is seated against the valve seat 113 when the valve assembly 100 is closed. The moveable member 120 also comprises an armature 122 at its second end. The moveable member 120 is moveable in an axial direction along axis 105 to bring the valve element 121 into and out of engagement with the valve seat 113 to selectively open and close the valve. In this example, the armature 122 is a flat armature which is elongate in a transverse direction such that its maximum transverse dimension is greater than its maximum axial dimension. The armature 122 may be directly connected to the valve element 121. In this example, the moveable member 120 further comprises a shaft portion 123 extending axially between the valve element 121 and the armature 122 to connect these two portions of the moveable member 120.

The moveable member 120 may be a single, unitary component such that the armature 122, shaft portion 123 and valve element 121 are provided as different portions of a single piece. Alternatively, one or more of the armature 122, shaft portion 123 and/or valve element 121 may be provided as separate, discrete component, as discussed below in relation to FIG. 3.

The valve assembly 100 further comprises a biasing member 130 configured to support and bias the moveable member 120 in the axial direction. The biasing member 130 may be configured to bias the moveable member 120 towards a first of its open and closed positions. The biasing member 130 may comprise a spring, preferably a flat spring, such as a plate spring. The biasing member 130 may comprise a plurality of transversely extending biasing components. In the illustrated example, the biasing member 130 is configured to bias the moveable member 120 towards its closed position. In an alternative arrangement, such as one in which energising the coil 210 is configured to move the moveable member 120 towards its closed position, the biasing member 130 may be configured to bias the moveable member 120 towards its open position. In either case, the biasing member 130 is generally configured to exert a biasing force on the moveable member 120 in an axial direction opposite to the axial direction of the magnetic force provided by the solenoid. The biasing member 130 may be restrained against movement in the axial direction relative to the moveable member 120 and relative to the valve body 110 in any suitable manner. In the illustrated embodiment, the inner portion of the biasing member 130 is located in a groove 125 in the outer surface of the moveable member 120 and the outer portion of the biasing member 130 is located in a groove 118 in the inner surface of the outer wall of a pressure compensation chamber 116.

The valve assembly 100 further comprises a flexible membrane 140 which forms a seal against the moveable member 120 and the valve body 110. The flexible membrane 140 delimits the valve chamber 115, in which the valve element 121 is located, from the pressure compensation chamber 116, within which the armature 122 is enclosed. The flexible membrane 140 may comprise a substantially annular diaphragm extending transversely to the axis 105 of the valve assembly 100. The flexible membrane 140 may be planar. The flexible membrane 140 may be comprised of a resilient material, such as an elastomeric material. The elastomeric material may comprise nitrile-butadiene (NBR) rubber, ethylene propylene diene monomer (EPDM) rubber, fluoroeslastomer (FPM) and/or perfluoroelastomer (FFPM). The flexible membrane 140 may be sealed against the moveable member 120 and against the valve body 110 in any suitable manner. In the illustrated embodiment, the inner edge of the flexible membrane 140 is located and retained in an annular groove 126 in the outer surface of the moveable member 120 and the outer edge of the flexible membrane 140 located and retained in an annular groove 117 in the inner surface of the valve body 110.

The moveable member 120 is connected to the valve body only by the biasing member 130 and the flexible membrane 140 and is free to move in the axial direction and to rotate about a transverse axis subject to the compliance of the biasing member 130 and the flexible membrane 140. In this manner, the moveable member 120 effectively floats within the valve body and can oscillate about a transverse axis.

In the illustrated example, the first fluid port 111 is defined by an orifice extending through the valve seat 113. The valve seat 113 is located within the valve body 110 such that a clearance is provided between the outer surface of the valve seat 113 and the inner surface of the valve body 110. This clearance defines the second fluid port 112. In this manner, the second fluid port 112 is provided by an orifice of the valve body 110 extending around the valve seat 113. The valve seat 113 may be an integral part of the valve body 110 or removable from the valve body 110. The first fluid port 111 and the second fluid port 112 may be concentric. In the illustrated arrangement, the valve seat 113 is located in the valve chamber 115 such that the second fluid port 112 is fluidly connected to the valve chamber 115. The moveable member 120 defines a pressure compensation flow path 160 by which the first fluid port 111 is fluidly connected to the pressure compensation chamber 116. The biasing member 130 may be located in the pressure compensation chamber 116, as shown in FIG. 1, or in the valve chamber 115. The flexible membrane 140 has a first surface facing towards the valve chamber 115 and an opposite second surface facing towards the pressure compensation chamber 116. In this manner, the flexible membrane 140 can provide at least one surface on which a pressure from at least one of the first 111 and second 112 fluid ports can act to provide a pressure compensating force on the moveable member 120.

An actuator assembly 200 is positioned against an end of the valve assembly 100 and is configured to move the moveable member 120 along the axis 105 to selectively open and close the valve 10. In this respect, the actuator assembly may comprise an electromagnetic actuator such as a solenoid. In the illustrated arrangement, the actuator assembly 200 comprises a solenoid coil 210 disposed around a bobbin 220 provided within a housing 230 of the actuator assembly 200. A fixed core 240, which may comprise a ferromagnetic material, may be provided within a central passage defined by the coil 210 and the bobbin 220. The fixed core 240 may extend along the axis 105 of the valve assembly 100. The actuator assembly 200 includes means (not shown) to energise the coil 210, by applying an electrical current thereto. A shim 250 may be provided between the valve assembly 100 and the actuator assembly 200 to limit the stroke of the moveable member 120 in the axial direction. The shim 250 may be configured as a seal to fluidly isolate the actuator assembly from the valve assembly. In the illustrated embodiment, the shim 250 extends transversely across the top of the pressure compensation chamber 116 to prevent fluid in the pressure compensation chamber from interacting with the actuator assembly 200. The housing 230 of the actuator assembly 200 may be integral with the valve body 110. In the illustrated embodiment, the housing 230 comprises a downwardly extending annular wall 231 by which the actuator assembly 200 is connected to the valve assembly 100 to form the valve 10, for example by using a threaded connection between an inner surface of the annular wall 231 and an outer surface of the valve body 110. The actuator assembly 200 may have any suitable shape. In the illustrated arrangement, the housing 230 of the actuator assembly is substantially cylindrical and is parallel to the axis 105 of the valve assembly 100.

Further detail of the valve will now be described with reference to FIG. 2 which shows an enlarged view of the valve assembly 100. As discussed above, the moveable member 120 defines the pressure compensation flow path 160 by which the first fluid port 111 is fluidly connected to the pressure compensation chamber 116. The pressure compensation flow path 160 comprises a first axial portion 161 with a first cross sectional area, or hydraulic diameter, and a second axial portion 162 with a second cross sectional area, or hydraulic diameter, which is less than the first hydraulic diameter. In the illustrated example, the first axial portion 161 is provided by an axial bore in the valve element 121 and the second axial portion 162 is provided by an axial bore in the shaft portion 123. A third axial portion 163 may also be provided, the third axial portion extending at least partially into the armature 122. In the illustrated embodiment, the third axial portion 163 is a blind passage. In other embodiments, the third axial portion 163 may extend through the full axial extent of the armature 122 such that it opens into the pressure compensation chamber 116 on the upper surface of the armature 122.

The pressure compensation flow path 160 further comprises at least one opening 165 extending into the pressure compensation chamber 116 at an axial position between the armature 122 and the flexible membrane 140. This may be a single opening. The moveable member 120 may comprise a plurality of openings 165. The moveable member 120 may comprise more than two openings 165, preferably more than three openings 165, most preferably four openings 165. In the illustrated embodiment, the pressure compensation flow path 160 comprises four openings 165 defined in an outer surface of the moveable member 120 and fluidly connected to the first and second axial portions 161 and 162 by a plurality of transverse bores 164 provided in the moveable member 120. The openings 165 may be radial openings, that is to say the openings may have an axis perpendicular to the axis 105 along which the moveable member 120 is actuated. In the illustrated arrangement, the transverse bores 164 are perpendicular to the axis 105, but it will be appreciated that other angles could be adopted. For example, one or more of the transverse bores may extend at an angle of approximately 45° to the axis 105.

The openings 165 may extend into the pressure compensation chamber 116 at a position adjacent to the flexible membrane 140. That is, at a position in which no intermediate components, such as the armature and/or the biasing member, are located between the openings and the flexible membrane 140. The openings 165 are positioned at a first axial distance D1 from the flexible membrane, wherein the first axial distance D1 is defined as the minimum axial distance between any part of the openings 165 and the flexible membrane 140. Where the biasing member 130 is located in the pressure compensation chamber 116, as shown in FIG. 2, the biasing member 130 is positioned at a second axial distance D2 from the flexible membrane 140, wherein the second axial distance D2 is greater than the first axial distance D1. The first axial distance may be less than 50% of the second axial distance, for example, less than 40%, less than 30%, or less than 20% of the second axial distance. In the illustrated embodiment, the first axial distance is less than 10% of the second axial distance. The height of one or more of the openings 165 in the axial direction may be greater than the first axial distance. In examples in which the opening is circular, the height is the diameter of the opening. The height of one or more of the openings 165 may be more than twice the first axial distance, for example three times, four times, five times, or ten times greater than the first axial distance.

In the illustrated arrangement, the openings 165 extend into the pressure compensation chamber 116 at a position immediately adjacent to the flexible membrane 140.

Figure 2:
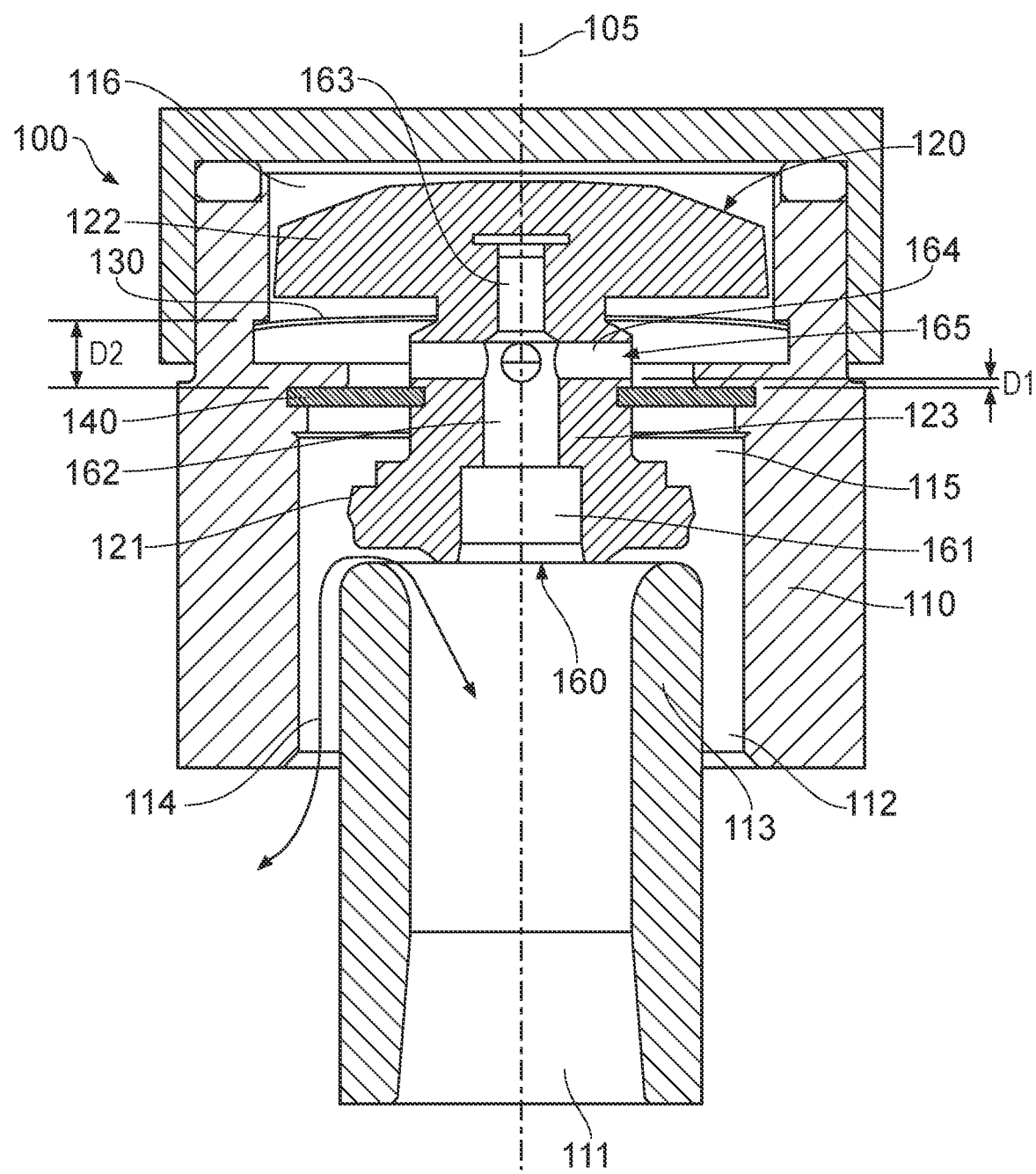
FIG. 2 is an enlarged cross-sectional view of the valve assembly of FIG. 1.

With reference to FIGS. 1 and 2, the operation of the valve 10 will now be discussed in relation to a normally closed valve assembly. In the normally closed configuration, the resilient biasing member is arranged to bias the moveable member 120 towards the valve seat, while the actuator assembly is configured to lift the moveable member 120 away from the valve seat when the coil is energised. In such a configuration, the valve is closed when the actuator assembly is deactivated. It will be understood that the same valve assembly could be modified to be a normally open valve assembly by arranging the biasing member to bias the moveable member 120 away from the valve seat and arranging the actuator assembly to move the moveable member towards the valve seat when energised. In such a configuration, the valve is open when the actuator assembly is off.

When the valve 10 is closed, the moveable member 120 is biased towards the valve seat by the biasing member 130 to seal the valve element 121 against the valve seat and thereby prevent fluid communication between the first fluid port 111 and the second fluid port 112. The second fluid port 112 is in fluid communication with the valve chamber 115 such that the fluid pressure in the valve chamber 115 is essentially the same as the fluid pressure in the second fluid port 112. The pressure compensation flow path 160 fluidly connects the first fluid port 111 to the pressure compensation chamber 116 to equalise the fluid pressures in the first fluid port 111 and the pressure compensation chamber 116. Thus, a pressure difference across the valve seat between the first fluid port 111 and the second fluid port 112 is balanced by a pressure difference across the flexible membrane 140 between the pressure compensation chamber 116 and the valve chamber 115. This can reduce the magnitude of the biasing force required to keep the valve in the closed position and, consequently, reduce the size and energy requirements of the actuator assembly.

Thus, where the fluid pressure in the first fluid port 111 is greater than the fluid pressure in the second fluid port 112, the fluid in the first fluid port 111 acts to lift the moveable member 120 against the force of the biasing member 130 by acting against the underside of the valve element 121, and the fluid in the pressure compensation chamber 116 acts against the top surface of the flexible membrane 140 to push the moveable member 120 towards the valve seat. This arrangement provides a pressure compensation force on the moveable member 120 such that it can be maintained in a desired position more easily.

To open the valve 10, the coil 210 is energised to generate a magnetic field which interacts with the armature 122 to pull it towards the actuator assembly 200 and thereby move the moveable member 120 towards its open position and lift the valve element from the valve seat. In alternative arrangements, the solenoid may instead be configured such that energising the coil 210 moves the moveable member 120 towards its closed position or switches the moveable member 120 between two or more positions to control the flow of fluid between two or more fluid ports. By varying the power supplied to the solenoid, the moveable member 120 may be held in any one of a plurality of positions between a closed position and a fully open position. In the open position, or in a partially open position as shown in FIGS. 1 and 2, the first fluid port 111 and the second fluid port 112 are in fluid communication across the valve seat along a fluid path 114. Fluid may be communicated through the fluid path 114 in either direction, that is to say that fluid may be communicated from the first fluid port 111 to the second fluid port 112 or from the second fluid port 112 to the first fluid port 111, as illustrated by the double-headed arrow in FIG. 2. In the example shown, the biasing member 130 biases the moveable member 120 towards its closed position such that the valve element 121 seals against the valve seat 113. This blocks the fluid path 114 between the first fluid port 111 and the second fluid port 112.

As in the closed position, the first fluid port 111 is in fluid communication with the pressure compensation chamber 116 through the pressure compensation flow path 160 in the moveable member 120, which terminates in the openings 165. By positioning the openings 165 of the pressure compensation flow path 160 at an axial location between the armature 122 and the upper surface of the flexible membrane 140, particularly at a position directly adjacent to the membrane as shown in FIGS. 1 and 2, pressure fluctuations in the first fluid port 111 can be almost instantaneously transferred to the upper surface of the flexible membrane 140. This counteracts the tendency for pressure fluctuations to vary the axial position of the moveable member 120 and enables the valve opening position to be more accurately controlled.

Figure 3:
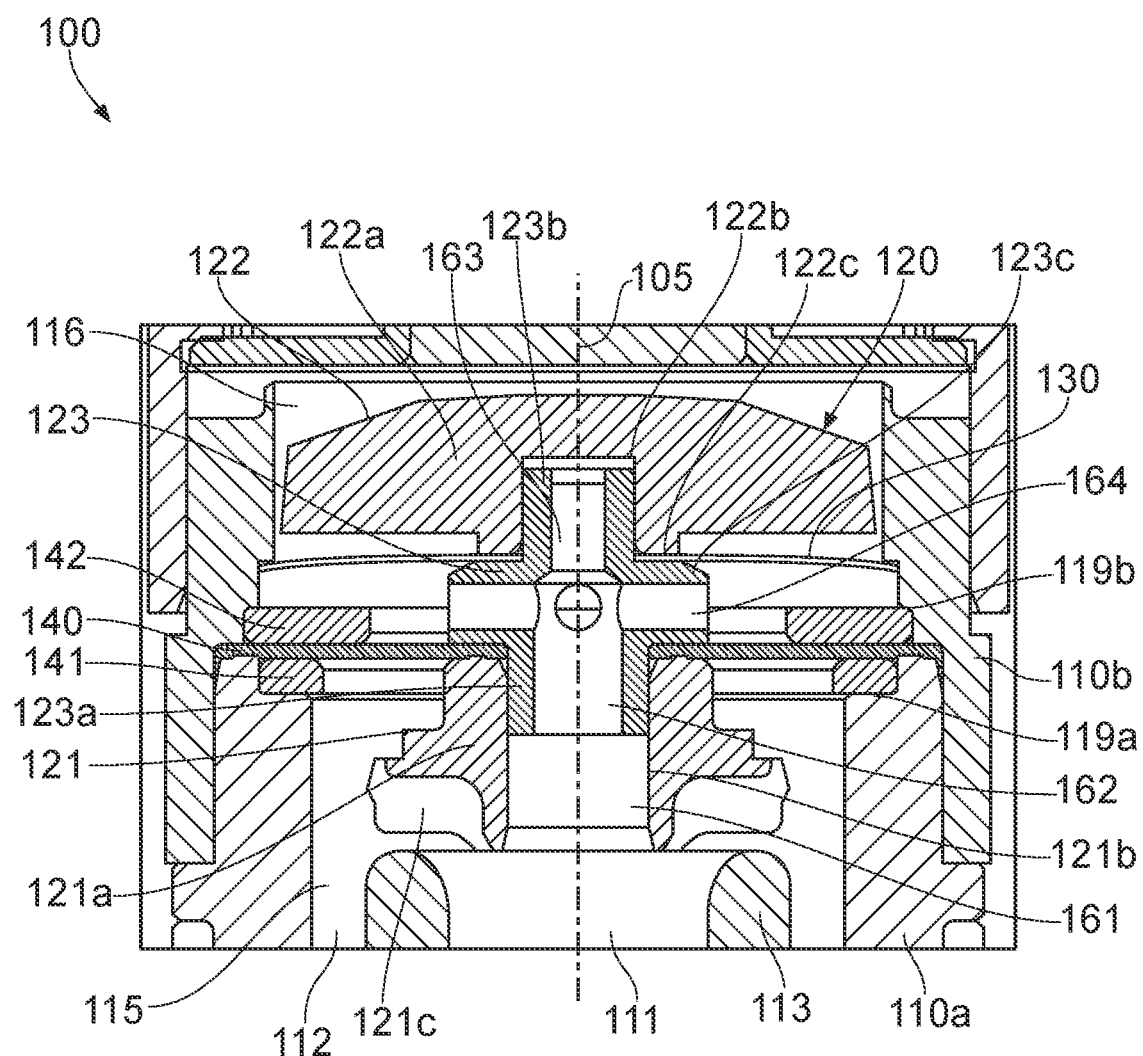
FIG. 3 is a cross-sectional view illustrating a valve assembly according to a second embodiment of the present invention.

As shown in FIG. 3, at least one component of the valve assembly 100 may be comprised of a plurality of discrete components. In this respect, the valve body 110 may be provided as a single unitary component. Alternatively, the valve body 110 may comprise a first valve body portion 110a and a second valve body portion 110b which are joined together to define the valve body 110. In the illustrated embodiment, the first valve body portion 110a defines the valve chamber 115 and the second valve body portion 110b defines the pressure compensation chamber 116. The first 110a and second 110b valve body portions may be substantially cylindrical and sized such that the first valve body portion 110a is concentrically received within the second valve body portion 110b or vice versa. In the illustrated arrangement, the first valve body portion 110a forms an interference fit inside the second valve body portion 110b.

The outer edge of the flexible membrane 140 is located and retained in an annular groove in the inner surface of the valve body 110. In the embodiment of FIG. 3, the flexible membrane 140 is held within a groove defined between the first 110a and second 110b valve body portions. In the arrangement shown, the outer edge of the flexible membrane 140 is held between opposite surfaces of the first 110a and second 110b valve body portions. The flexible membrane may be clamped between an upper surface of the first valve body portion 110a and a lower surface of the second valve body portion 110b. A first retaining ring 141 may be provided in the valve chamber 115 adjacent to the bottom surface of the flexible membrane 140. A second retaining ring 142 may be provided adjacent to a top surface of the flexible membrane 140. The flexible membrane 140 may be clamped between the first retaining ring 141 and the second retaining ring 142, whereby the first and second retaining rings define at least part of the groove between first and second valve body portions. In the arrangement shown, the underside of the first retaining ring 141 rests against an upward facing shoulder 119a on the inner surface of the first valve body portion 110a and the upper surface of the second retaining ring 142 rests against a downward facing shoulder 119b on the inner surface of the second valve body portion 110b. The first retaining ring 141 and the second retaining ring 142 are sandwiched together between the shoulders 119a and 119b to secure the retaining rings in place and to exert a clamping force on the flexible membrane 140 when the first and second valve body portion 110a and 110b are assembled together to form the valve body 110. Together with the first 110a and second 110b valve body portions, the first 141 and second 142 retaining rings may be dimensionally tuned so as to control the effective area of the top and bottom surfaces of the flexible membrane 140 available for the purposes of pressure compensation. In the embodiments shown in FIGS. 1 to 3, the effective area of the top surface of the flexible membrane exposed to the fluid pressure in the pressure compensation chamber 116 is smaller than the effective area of the bottom surface of the flexible membrane exposed to the fluid pressure in the valve chamber 115. This increases the amount of force acting on the bottom surface of the membrane relative to the force acting on the top surface of the membrane for a given fluid pressure. In some embodiments, the effective area of the top surface of the flexible membrane is substantially the same as the effective area of the underside of the valve element such that the hydraulic forces on the top surface of the flexible membrane and on the underside of the valve element cancel each other out.

The moveable member 120 may be provided as a single unitary component. Alternatively, the moveable member 120 may comprise a plurality of discrete components, which may be fixed or fitted together by any suitable means. The valve element 121 and the armature 122 may be discrete components which are directly connected to each other in the absence of an intermediate shaft portion. The valve element 121 and the shaft portion 123 may be provided as a unitary component and the armature 122 provided as a discrete component which is connected to the shaft portion 123. The armature 122 and the shaft portion 123 may be provided as a unitary component and the valve element 121 provided as a discrete component which is connected to the shaft portion 123.

In the embodiment illustrated in FIG. 3, the valve element 121, armature 122 and shaft portion 123 are provided as three discrete components which are connected together to form the moveable member 120. These components may be fitted together, by an interference fit or otherwise, so as to be retained in fixed relation to one another and constrained to move as a single body during operation of the valve.

The valve element 121 may comprise an annular body 121*a* with an axial bore 121*b* extending along the axis 105 of the valve assembly 100 to define the first axial portion 161 of the pressure compensation flow path. The transversely extending shoulder 124 may comprise a resilient sealing element 121*c* for engagement with the valve seat 113 when the valve is closed. The armature 122 may comprise a disc shaped body 122*a* having a blind bore or cavity 122*b* disposed therein and extending along the axis 105. The cavity 122*b* may be surrounded by a downwardly extending annular lip 122*c*.

Unlike some known arrangements, the armature 122 does not extend axially to a position within the coil 210. Due to this arrangement, the moveable member 120 is able to rock, or rotate, about a transverse axis such that its longitudinal axis can be misaligned with the valve axis 105 without being constrained by any axial extension into the coil 210. Instead, the moveable member 120 can rock about a transverse axis to the extent allowed by the stiffness and/or compliance of the flexible membrane 140 and the biasing member 130. In this way, when the valve is in its open position and not in contact with the valve seat 113 such that its movement is not constrained by the valve seat 113, it will be appreciated that rotation of the moveable member 120 about the transverse axis is constrained solely by the biasing member 130 and the flexible membrane 140. This therefore provides an additional degree of freedom of movement through which the valve assembly 100 can compensate for imbalances of pressure.

The shaft portion 123 comprises a first end 123*a* and a second end 123*b*. In the example shown, the first end 123*a* is located at a lower end of the shaft portion 123 and is received in the axial bore 121*b* of the valve element 121, while the second end 123*b* is located at an upper end of the shaft portion 123 and is received and retained in the blind cavity 122*b* in the underside of the armature 122.

The first end 123*a* of the shaft portion 123 may be substantially cylindrical and comprise an axial bore. The first end 123*a* is concentrically received in the axial bore 121*b* of the valve element 121 and may be retained via an interference fit. The first end 123*a* extends along only part of the length of the axial bore 121*b* of the valve element 121, such that the exposed portion of the axial bore 121*b* beneath the shaft portion 123 defines the first axial portion 161 of the pressure compensation flow path 160 and the axial bore of the first end 123*a* defines the second axial portion 162 of the pressure compensation flow path 160. The first axial portion 161 has a first diameter defined by the diameter of the axial bore 121*b* of the valve element 121. The second axial portion 162 has a second diameter defined by the diameter of the axial bore of the first end 123*a* of the shaft portion 123, wherein the first diameter is greater than the second diameter.

The second end 123*b* may be substantially cylindrical and may comprise an axial bore extending along the axis 105 to define the third axial portion 163 of the pressure compensation fluid path 160. Between the first end 123*a* and the second end 123*b* of the shaft portion 123 is an intermediate shaft portion in the form of at least one transversely extending shoulder or projection 123*c* which defines the transverse bores 164 of the pressure compensation flow path 160. Such transverse bores may extend in a direction perpendicular to the axis 105. The at least one transverse shoulder or projection 123*c* has a transverse dimension which is greater than that of the first end 123*a* and the second end 123*b* of the shaft portion 123. The at least one transverse shoulder 123*c* may comprise a single annular shoulder which circumscribes the shaft portion 123. Alternatively, the at least one transverse shoulder 123*c* may comprise a plurality of transverse shoulders 123*c* which are spaced apart in the circumferential direction. As the transverse shoulder 123*c* of the shaft portion 123 extends beyond the second end 123*b* of the shaft portion 123 in the transverse direction, the biasing member 130 may be clamped between the at least one transverse shoulder 123*c* and the armature 122, while the flexible membrane 140 may be clamped between the at least one transverse shoulder 123*c* and the valve element 121.

Specifically, the biasing member 130 may be retained at an inner portion thereof in a groove defined between a bottom surface of the lip 122*c* of the armature 122 and an upper surface of the transverse shoulder 123*c* of the shaft portion 123. Therefore, the biasing member 130 may be held in fixed relation to the moveable member 120 by being clamped between the second end 123*b* of the shaft portion 123 and the armature 122. The second end 123*b* may extend along only part of the length of the blind cavity 122*b* such that a gap is provided between a top surface of the second end 123*b* and the closed end of the blind cavity 122*b*. This clearance at the second end 123*b* of the shaft portion 123 ensures that the biasing member 130 can be securely clamped between the armature 122 and the shaft portion 123 regardless of the manufacturing tolerances of the second end 123*b* and the blind cavity 122*b*. Similarly, the flexible membrane 140 may be retained at an inner edge thereof in a groove between the bottom surface of the transverse shoulder 123*c* of the shaft portion 123 and an upper surface of the annular body 121*a* of the valve element 121. The degree to which the flexible membrane 140 is clamped by these components can be tuned during assembly by adjusting the relative axial positions of the valve element 121 and the shaft portion 123.

The arrangement shown in FIG. 3 is particularly advantageous for the assembly of the valve, especially if assembly were to be performed by sequentially inserting components into the bottom end of the valve assembly 100, that is, into the end of the valve assembly in which the fluid ports are located. In this respect, starting from the second valve body portion 110b, which may be fixed to the annular wall 231 of the housing 230 of the actuator assembly 200, the armature 122 can be inserted into the second valve body portion 110b from the bottom end of the valve assembly 100. Subsequently, the biasing member 130 can be inserted, followed by the shaft portion 123, wherein the second end 123b of the shaft portion 123 can be interference fit with the cavity 122b of the armature 122 to thereby retain the inner portion of the biasing member 130. The outer portion of the biasing member 130 may be retained in a particular axial position by the groove 118 of the second valve body portion 110b. Following this, the first retaining ring 141 may be inserted into the bottom end of the valve assembly 100 so as to surround the shaft portion 123, and it may be retained in a particular axial position by the downward facing shoulder 119b on the inner surface of the second valve body portion 110b. Then, the valve element 121, with the sealing element 121c, may be inserted into the bottom of the valve assembly 100 and interference fit with the first end 123a of the shaft portion 123 to thereby hold an inner portion of the flexible membrane 140 in a fixed position. Finally, the first retaining ring 141 and the first valve body portion 110a can be inserted into the bottom of the valve assembly 100 so as to be concentrically received by the second valve body portion 110b and to secure an outer portion of the flexible membrane 140 in a fixed position. The valve seat 113, defining the first fluid port 111, may be comprised as an integral part of the first valve body portion 110a or may be a discrete component fixed thereto by an interference fit or any other suitable fixing means.

Figure 4:
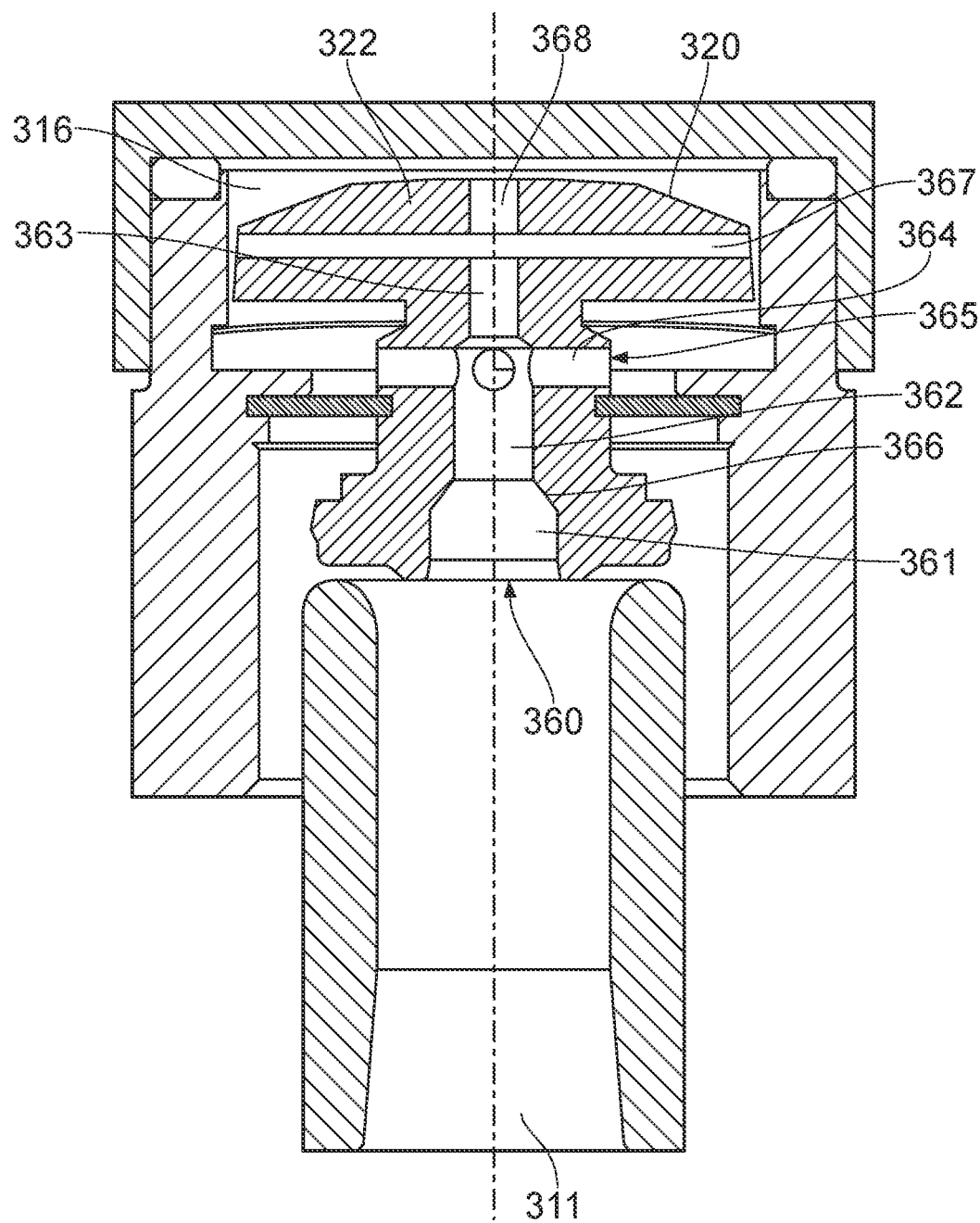
FIG. 4 is a cross-sectional view illustrating a valve assembly according to a third embodiment of the present invention.

Referring to FIG. 4, a second embodiment of a valve assembly 300 is shown. The second embodiment is similar in structure and operation to the first embodiment of the valve assembly discussed above in relation to FIGS. 1-3 and similar reference numerals are used to denote similar features. In this embodiment, a first axial portion 361 and a second axial portion 362 of a pressure compensation fluid path 360 are connected by a sloped portion 366 in which the diameter of the pressure compensation flow path gradually decreases from the first diameter to the second diameter. This is in contrast to the first embodiment, in which there is a step change between the first and second diameters. The sloped portion 366 may be provided by a substantially conical surface. Where a moveable member 320 is formed from discrete elements, as shown in FIG. 3, the sloped portion 366 is preferably provided as a sloped end face at the first end of the shaft portion.

An additional optional feature illustrated by FIG. 4 is related to an armature 322. In addition to openings 365 of the pressure compensation fluid path 360 into a pressure compensation chamber 316, the armature 322 may comprise one or more transverse armature bores 367 which provide additional openings into the pressure compensation chamber 316. The transverse armature bores 367 may extend transversely outward from the axis 105 to a side surface of the armature 322. Further, instead of having a blind cavity (see FIG. 3), the armature 322 may comprise a through hole 368 which is open to the upper surface of the armature 322 to fluidly connect a third axial portion 363 with the pressure compensation chamber 316. Therefore, during use, fluid may flow from a first fluid port 311, through the first 361 and second 362 axial portions of the pressure compensation fluid path 360 and then into the pressure compensation chamber 316 through transverse bores 364 and openings 365, through the third axial portion 363 and the through hole 368 and through the transverse armature bores 367. The provision of multiple flow paths can further reduce the time lag between pressure changes in the first fluid port 111 and the pressure compensation chamber to further improve valve control.

Various modifications, whether by way of addition, deletion and/or substitution, may be made to all of the above-described embodiments to provide further embodiments, any and/or all of which are intended to be encompassed by the appended claims.

The invention claimed is:
1. A valve assembly for a valve, comprising:
a valve body having walls defining a valve chamber;
a first fluid port;
a second fluid port;
a valve seat located between the first and second fluid ports;
a moveable member comprising:
    a valve element at its first end,
    an armature at its second end, and
    a shaft portion extending axially between the valve element and the armature,
    wherein the moveable member is moveable in an axial direction to bring the valve element into and out of engagement with the valve seat to selectively open and close the valve and wherein the entire moveable member is spaced from the walls of the valve body when the valve is open or partially open;
at least one biasing member configured to support and bias the moveable member in the axial direction; and
a flexible membrane which forms a seal against the moveable member and the valve body to divide the valve chamber into a flow chamber in which the valve seat and valve element are located and a pressure compensation chamber within which the armature is entirely enclosed,
wherein the moveable member comprises one or more bores defining a pressure compensation flow path by which the first fluid port is fluidly connected to the pressure compensation chamber, the pressure compensation flow path having at least one opening extending into the pressure compensation chamber at an axial position between the armature and the flexible membrane,
wherein the pressure compensation flow path comprises:
    a first axial portion with a first length and a first cross-sectional area; and
    a second axial portion adjacent to the first axial portion with a second length and a second cross-sectional area which is less than the first cross-sectional area,
    wherein the first length is at least 20 percent of the second length;
wherein the valve element comprises a first axial bore and the shaft portion comprises a second axial bore, wherein the first axial portion of the pressure compensation flow path is defined by the first axial bore and the second axial portion of the pressure compensation flow path is defined by the second axial bore, the shaft portion and the valve element being discrete components which are fixed together with an interference fit.
2. The valve assembly according to claim 1, wherein the armature is flat.
3. The valve assembly according to claim 1 or claim 2, wherein the moveable member is a free-floating moveable member.

4. The valve assembly according to claim 1, wherein a first end of the shaft portion is press fit within the first axial bore of the valve element to fix the shaft portion to the valve element.

5. The valve assembly according to claim 1, wherein the shaft portion comprises at least one transverse bore in fluid communication with the second axial bore, the at least one transverse bore forming part of the pressure compensation flow path and defining the at least one opening of the pressure compensation flow path.

6. The valve assembly according to claim 5, wherein the at least one transverse bore extends substantially perpendicular to the axial direction of the moveable member.

7. The valve assembly according to claim 5, wherein the shaft portion comprises at least one transversely extending shoulder in which the at least one transverse bore is defined.

8. The valve assembly according to claim 1, wherein the shaft portion and the armature are discrete components which are fixed together with an interference fit.

9. The valve assembly according to claim 1, wherein the at least one opening extends into the pressure compensation chamber at a position immediately adjacent to the flexible membrane.

10. The valve assembly according to claim 1, wherein the at least one opening is a plurality of openings.

11. The valve assembly according to claim 1, wherein the flexible membrane is planar.

* * * * *